United States Patent [19]
Quanbeck et al.

[11] 3,751,892
[45] Aug. 14, 1973

[54] HAYSTACK MAKING MACHINE

[76] Inventors: Sherman H. Quanbeck, Aneta, N. Dak. 58212; Harold T. Gleason, Tolna, N. Dak. 58380

[22] Filed: May 14, 1971

[21] Appl. No.: 143,359

[52] U.S. Cl. .................................. 56/344, 56/350
[51] Int. Cl. ............................................ A01d 89/00
[58] Field of Search .............. 56/341, 343, 344–360; 100/220, 187; 214/522

[56] References Cited
UNITED STATES PATENTS

| | | | |
|---|---|---|---|
| 656,429 | 8/1900 | Southwick | 100/187 |
| 936,621 | 10/1909 | Fryman | 56/349 |
| 1,214,397 | 1/1917 | Weaner | 56/345 X |
| 3,556,327 | 1/1971 | Garrison | 214/522 |
| 1,936,603 | 11/1933 | Larson | 56/345 |
| 3,625,140 | 12/1971 | Glanz | 100/220 |
| 2,660,949 | 12/1953 | Russell | 100/187 |

Primary Examiner—Russell R. Kinsey
Assistant Examiner—J. N. Eskovitz
Attorney—Dugger, Peterson, Johnson & Westman

[57] ABSTRACT

A haystack making machine utilizing a hay pickup and an elevating conveyor, a haystack forming compartment, and linear movable compression packing means for packing the hay; all mounted on a frame. After a haystack has been formed means are provided for removing the haystack from the hay forming compartment.

17 Claims, 11 Drawing Figures

Patented Aug. 14, 1973

INVENTORS
SHERMAN H. QUANBECK
HAROLD T. GLEASON
BY
Dugger Peterson Johnson & Westman
ATTORNEYS Patented Aug. 14, 1973

INVENTORS
SHERMAN H. QUANBECK
BY HAROLD T. GLEASON

Dugger Peterson Johnson + Westman
ATTORNEYS

Patented Aug. 14, 1973

INVENTORS
SHERMAN H. QUANBECK
BY HAROLD T. GLEASON

ATTORNEYS

Patented Aug. 14, 1973

INVENTORS
SHERMAN H. QUANBECK
HAROLD T. GLEASON
BY
Dugger Peterson Johnson + Westman
ATTORNEYS Patented Aug. 14, 1973

INVENTORS
SHERMAN H. QUANBECK
HAROLD T. GLEASON
BY
Dugger, Peterson, Johnson & Westman
ATTORNEYS

HAYSTACK MAKING MACHINE

BACKGROUND OF THE INVENTION

1. Field of the Invention

The present invention relates to haystack forming machines that will form stacks from hay picked up from windrows of loose hay.

2. Prior Art

Various types of haystack forming machines have been advanced in the art. For example, U.S. Pat. No. 3,110,148 issued to Mader et al., illustrates a device for picking up loose hay, forming it into a hay cock or small stack as the device moves down the field. No provision is made in this device for compacting the hay, and the stacks made are quite small.

In addition, a device for picking up shocks of grain and the like as shown in U.S. Pat. No. 1,780,299, and this device has discharge means for removing the grain from a form or container.

In addition, U.S. Pat. No. 3,556,327 issued to Garrison shows a loose hay wagon which has a compressor that operates in a vertically reciprocating direction, and utilizes a blower for blowing the hay into the wagon itself. Means are provided for compacting, and also for discharging the compacted stack after it has been formed.

SUMMARY OF THE INVENTION

The present invention relates to a stack forming machine for hay, straw or the like which comprises a frame having pick up means, and a stack forming rack or body. The rack or body holds material that is received from the pick up means and the material is intermittently compressed in a selected direction. This forms vertically extending compacted slices or layers of material in the body. After the body is filled with firmly packed material the body is rotated so that the layers of material and the separation planes between layers which are formed to be disposed vertically now are resting horizontally. The stack is then removed from the body in this position so that the stack sheds water, and the layers rest one on top of the other.

In particular, the device is operated by filling the body or stack form initially with loose hay to a desired level, and compacting it with a plunger that moves in a horizontal direction. The plunger is retracted and the body is refilled. A plurality of compacted slices of compressed hay with the separation planes between the slices extending in vertical direction are formed. As shown, when the body is rotated the rear wall during forming of the stack rests against the ground. The first formed layer of hay then becomes the base layer for the stack. The stack is then removed in any suitable manner from the wagon and the layers of hay (or straw or the like) are disposed horizontally. The plunger for compacting the stack is rounded to form a round top on the stack.

Suitable retaining holding means can be utilized on the sides of the haystack forming compartment, and in the floor of the compartment to keep the individual layers compressed against the rear wall when the packer, which is operated hydraulically, is retracted.

The vertical conveyor for lifting loose material into the stack forming compartment of the present invention comprises a unique one piece chain structure operating through a chute, and which has automatically adjustable linkage for compensating for movement of the pick up device over uneven ground.

The packer device is mounted and operated with hydraulic cylinders, and all of the drives necessary are operated with hydraulic motors. Thus, an all hydraulic powered haystack forming machine is presented.

Because of the unique unloading motion, namely the rotation of the entire body to orient the layers of hay properly when unloaded, a reciprocating compacter operable in a generally horizontal direction is usable. This minimizes the number of working parts in the device and makes it simplier to build.

BRIEF DESCRIPTION OF THE DRAWINGS

FIG. 3 is a side elevational view of the device of FIG. 1 showing it in a dumping position;

DESCRIPTION OF THE PREFERRED EMBODIMENT

The haystack forming machine illustrated generally at 10 comprises a main frame 11 made up of longitudinally extending members 12,12 held together with suitable cross members shown only in dotted lines. The frame 11 is mounted on an axle 13 having wheels 14 mounted thereon for rotation to support the haystack forming machine. The spaced apart frame members 12,12 converge at their forward portions to form a support for a hitch tongue 15 that attaches to a tractor 16 through the conventional hitch 17 of the tractor. The device thus is a towed vehicle that may be pulled along the ground surface 18.

Figures 1, 9:
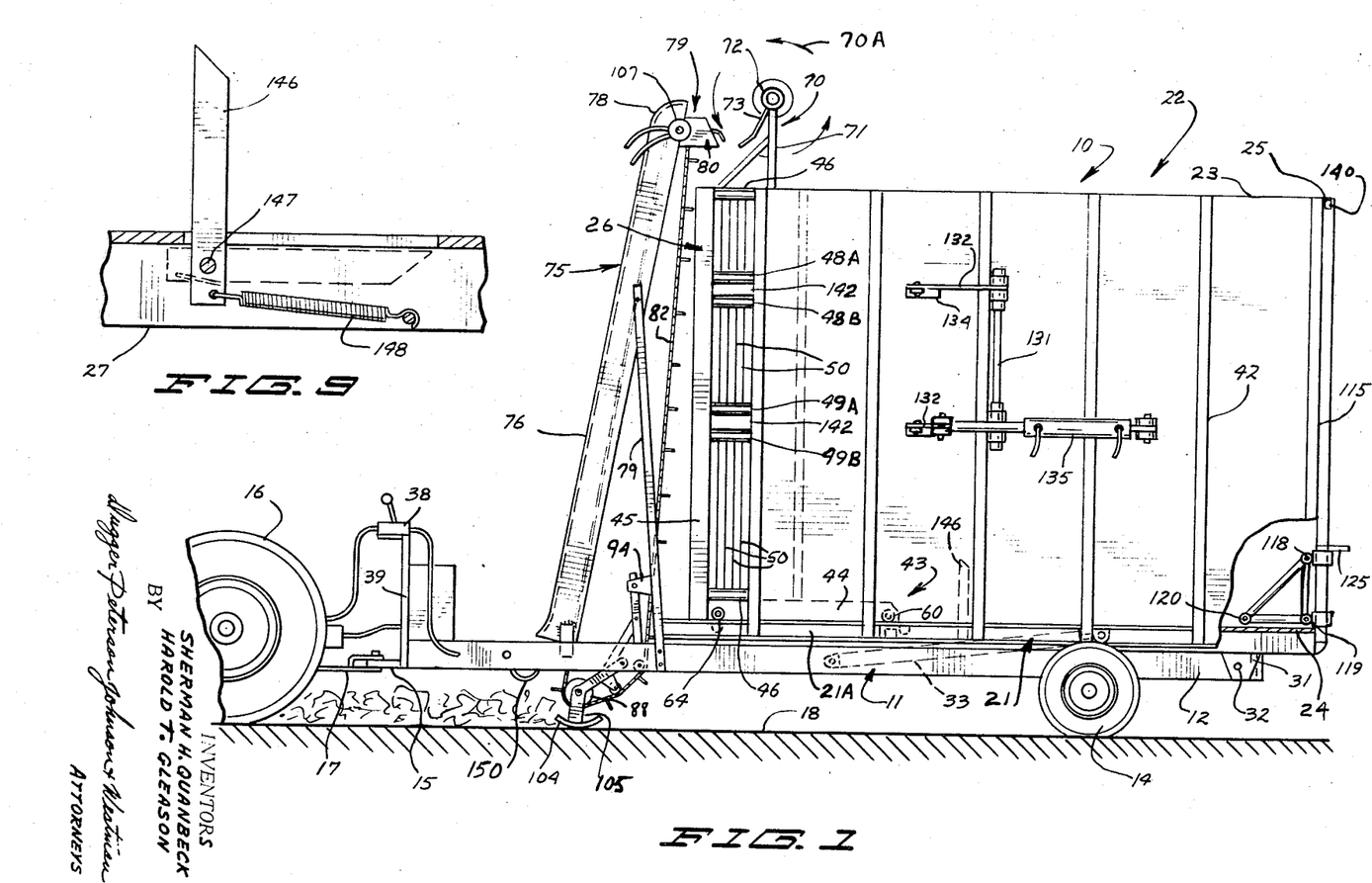
FIG. 1 is a side elevational view of a haystack forming device made according to the present invention.
FIG. 9 is an enlarged side sectional view of a hay retainer mechanism used with the present invention.

The haystack forming machine frame 11 supports a subframe assembly illustrated generally at 21, which in turn supports a hay or stack form compartment illustrated generally at 22. The hay compartment 22 has side walls 23,23 a bottom wall 24, and also has a slatted rear wall illustrated generally at 25, and a movable front wall assembly 26. The bottom 24 is supported in a suitable manner on a pair of longitudinally extending frame members 27,27 of subframe 21 that extend in fore and aft direction, and a number of cross member supports are mounted on these frame members 27 as desired to form subframe 21. The subframe assembly 21 has depending brackets 31 at the rear portions thereof, and these brackets 31 are pivotally mounted as at 32 to the rear portions of the longitudinally extending frame members 12. A pair of spaced apart hydraulic cylinders 33 are mounted as at 34 to suitable members on the main frame assembly 11, and include extendable and retractable rods 35 that are pivotally mounted as at 36 to brackets 37 also attached to the subframe assembly. The hydraulic cylinders 33 are controlled through a suitable valve, which is mounted in a valve cluster 38 at the forward portions of the machine. The valve cluster 38 is mounted onto a support 39. Fluid under pressure may be supplied from a suitable hydraulic pressure source, for example a pump driven by the tractor P.T.O. for powering the components. The cylinders 33 can be extended and retracted to control the movement of the subframe assembly 21 and the body member 22 about the pivot 32, from the position as shown in FIG. 1 where it is in loading position to the position shown in FIG. 3 where it is in its dumping position.

The side walls 23 of the hay compartment are supported with upright support members 42 connected to the outer member 21A of subframe 21 and these upright members 42 are spaced at intervals along the sides 23 of the hay compartment 22.

Figures 2, 6, 8:
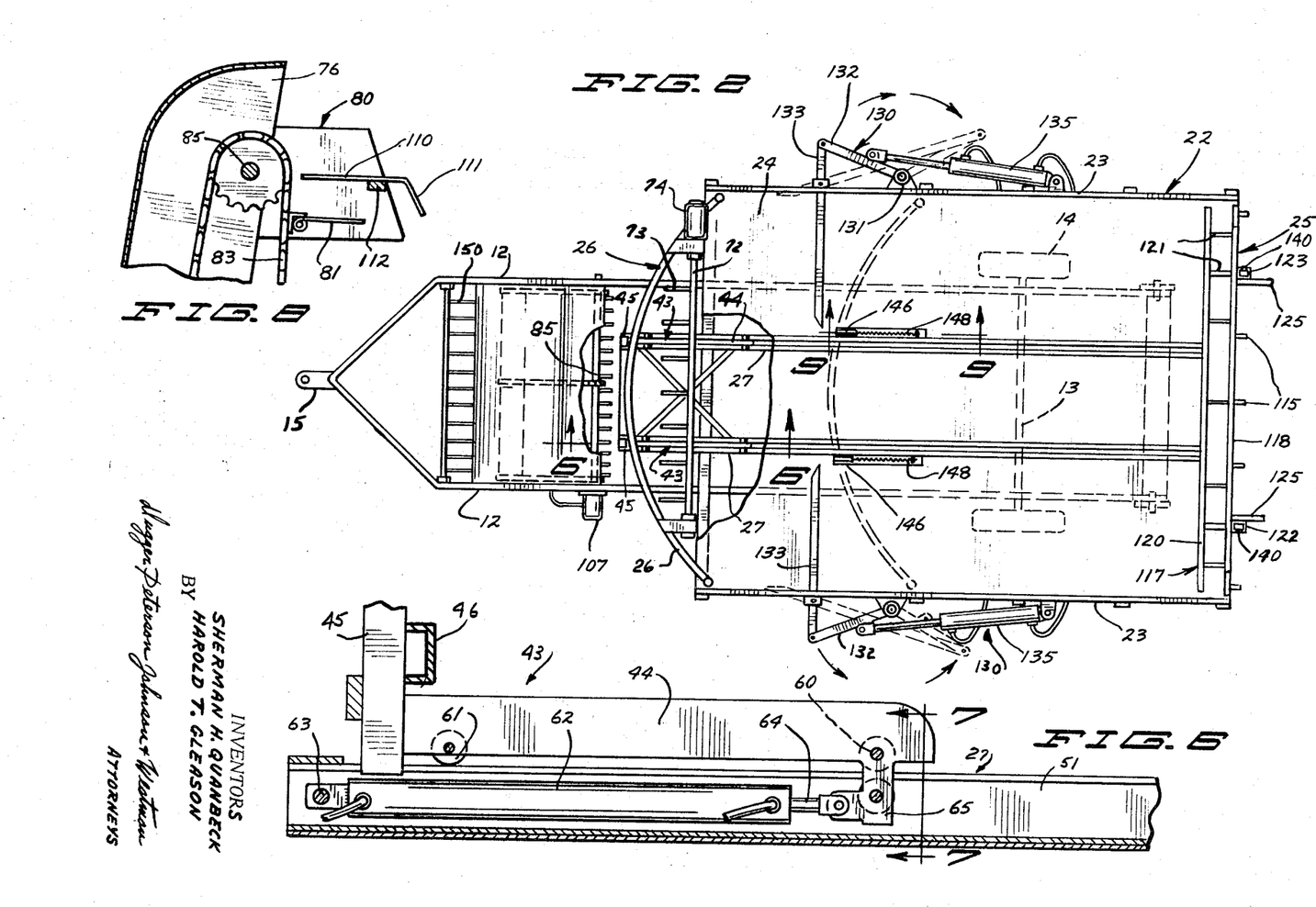
FIG. 2 is a top plan view of the device in FIG. 1 with parts broken away for sake of clarity.
FIG. 6 is a sectional view taken substantially on line 6—6 of FIG. 2.
FIG. 8 is a side view of the upper portion of the vertical hay conveyor of the present invention.

The movable front or forward wall 26 comprises a ram or plunger for compressing hay in the hay compartment 22, and this plunger is supported on a pair of transversely spaced carriages 43 that move along the frame members 27. The carriages 43 comprise horizontal support members 44, and very sturdy upright support members 45. The upright support members 45 are welded to the horizontal members 44, and the upright members are joined together with upper and lower members 46 which have channel shaped cross sections and which extend transversely to the hay compartment. Two pairs of intermediate transverse channel members 48A and 48B and 49A and 49B, respectively, are fixed to members 45 as well. The channels 46, 48A and B, and 49A and B are formed to an arcuate shape as shown in FIG. 2. Vertically extending rods or other suitable hay retaining members 50 are fastened between lower member 46 and channel 49B, between the channels 49A and 48B, and between channel 48A and upper member 46. This leaves two vertically spaced unobstructed slots or spaces 142 through front wall 26 on opposite sides thereof. The slots or spaces 142 extend laterally from each of the upright members 45 and open to the corresponding side edges of front wall 26 for a purpose to be explained. The front wall 26 is welded together to form a rigid member and give adequate support between the support members 44 and the upright members 45.

Figures 7, 9:
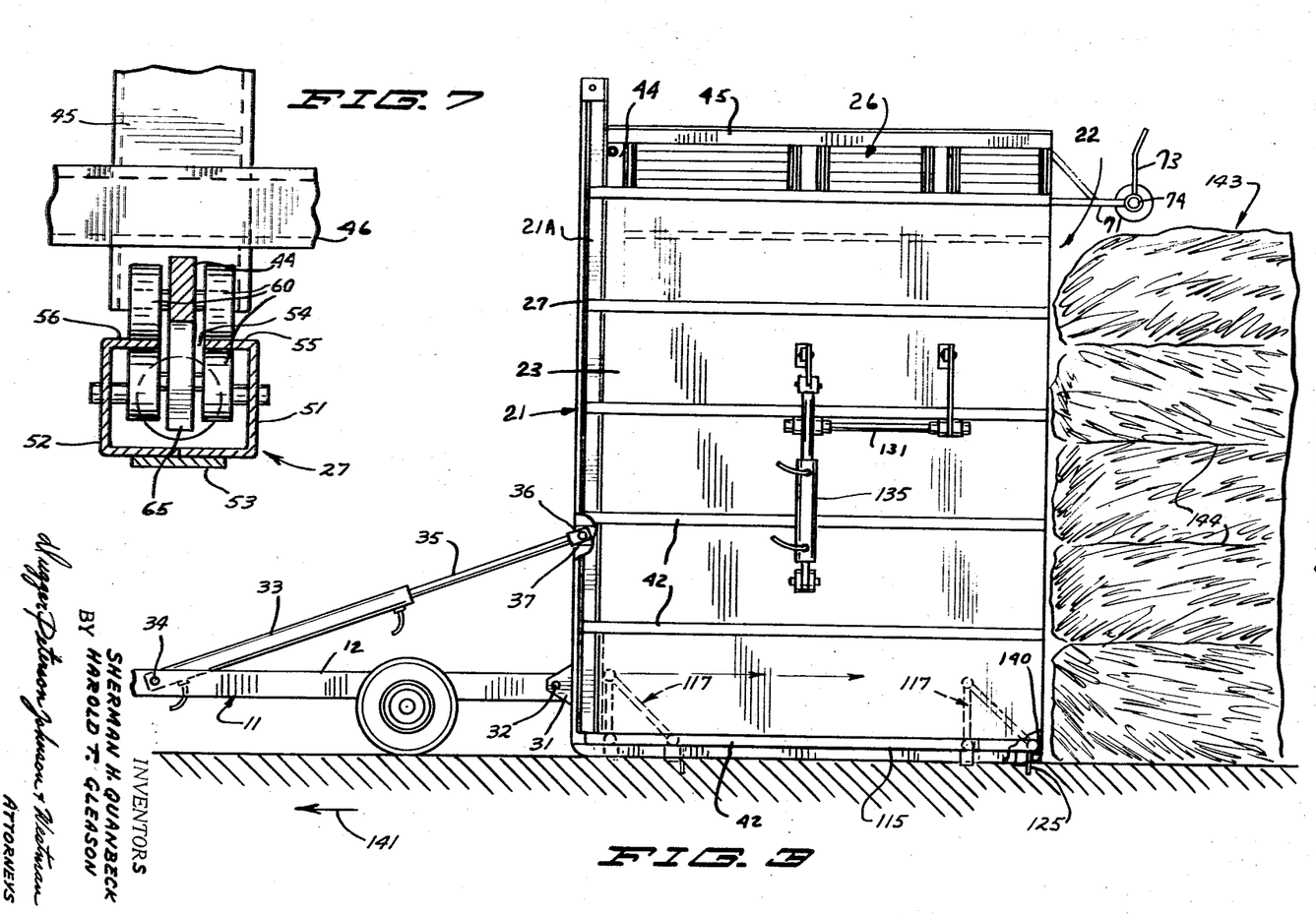
FIG. 7 is a sectional view taken as on line 7—7 in FIG. 6.

The horizontal members 44, comprising the base parts of the carriages 43 (the entire front wall 26 of the hay compartment moves with these members) are mounted for slidable movement with respect to the longitudinally extending main subframe supports 27,27 respectively. As shown, these longitudinally extending supports 27 (see FIG. 7) are formed with two facing channel members 51 and 52, respectively, which are fastened together with suitable braces 53, and at the upper portions form a space 54. The horizontal members 44 have an actuator portion 65 that extends through the space 54. The members 44 have support rollers thereon which engage the upper legs 55 and 56, respectively, of the channels 51 and 52. There is a first set of rollers 60 at the inner end (spaced from the front wall) of the carriages. The first set of rollers 60 includes top and bottom rollers which are rotatably mounted on the horizontal members 44. Rear rollers 61 are rotatably mounted on the horizontal members 44 and ride on top of the channel legs 54 and 55. The rollers 60 and 61 guide and support the carriages 43 as the front wall 26 is moved to compress hay. The actuating devices for the movable front wall or plunger 26 are also mounted between the channels 51 and 52 of each of these longitudinally extending subframe members 27. As shown, a separate hydraulic cylinder 62 is attached as at 63 to each of the respective frame members 27. The cylinders 62 are double acting hydraulic cylinders with power actuated rods 64 connected to the actuator portions 65 of their respective carriage 43.

Upon extension or retraction of the cylinders 62 by operation of a suitable valve included with the valve cluster 38, the cylinder rods 64 will extend simultaneously and both carriages 43 will be moved rearwardly along the frame members 27. The entire front wall 26 is moved rearwardly, as it is guided by the frame members 27 and the carriages 43.

The cross members 46, 48A, 48B, 49A and 49B and the upright members 45 are sufficiently strong to withstand this movement and consequent compaction of hay in the hay compartment.

On the top of the movable front wall or plunger 26, there is a beater mounted that slowly rotates and helps to receive hay and feed it into the compartment 22. The beater assembly is shown generally at 70, and comprises upright supports 71 fixed to the top cross member 46 of the movable wall 26. A cross shaft 72 is rotatably mounted in bearings on the supports, and this shaft 72 has a plurality of axially spaced apart long fingers 73 attached thereto extending radially outwardly on one side of the shaft only. The fingers 73 are of size to engage hay coming from a vertical conveyor assembly 75 and to move the hay rearwardly. The beater shaft 72 is direct drive coupled to the output shaft of a hydraulic motor 74 that is of conventional design and rotates at a very slow rpm (for example 20 rpm) in direction indicated by arrow 70A. The beater 70 helps move the hay into the hay compartment without any wrapping of the hay around the fingers 73 or the shaft 72.

The conveyor assembly 75 is constructed to comprise both a vertical or upright conveyor for hay, and the hay pick up means. This conveyor assembly comprises a chute member 76 which has a rectangular cross section, and has peripheral walls with open top and bottom ends. This chute 76 is fixed with brackets 77 to the main frame members 12, and extends between the frame members. At its upper end it has a curved portion 78, and suitable braces 79 are used between the upper portions of the chute and the main frame members 12 for further support. The discharge opening is illustrated generally at 79 and opens to the rear adjacent to fingers 73. In addition, a stripper assembly 80 is provided at the rear of the opening 79, to insure that hay will be stripped from spring fingers 81 of an endless chain assembly 82 that is mounted for moving the hay. The endless chain assembly 82 comprises three spaced apart chains 83 of usual design having attachment links and cross members 84 connected to the chains. The spring teeth 81 are attached to the cross members 84 in a known manner.

Figure 5:
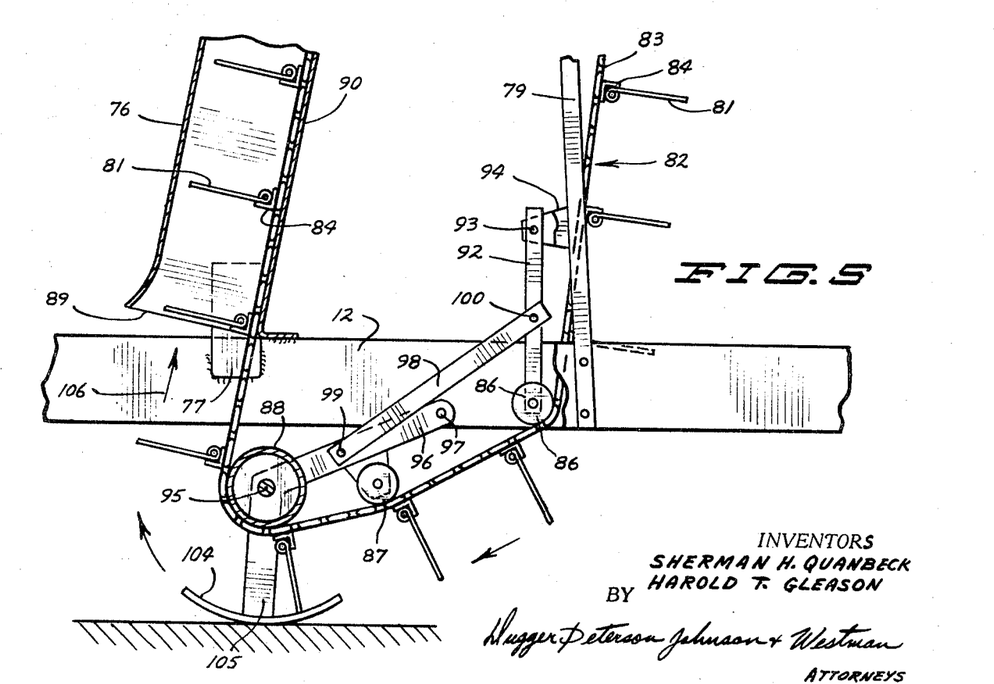
FIG. 5 is a fragmentary sectional view showing a compensating linkage used with the conveyor and pick up of the present invention.

The endless chains are mounted over sprockets which are drivably attached to a shaft 85 at the top end of the chute 76, and then the chain assembly has one reach or portion which extends downwardly between the supports 79, and around a movably mounted roller 86 (see FIG. 5), over another rotatably mounted guide roller 87, and then over a pick up drum 88. The forward chain reach or portion passes into the lower end of chute 76 at a lower opening 89, and is guided against the rear wall 90 of this chute member. The teeth 81 carried by the cross members 84 protrude forwardly from the rear wall 90, and of course clear the front wall of the chute member 76. The unit is made so that the pick up drum 88 can "float" across uneven ground, and the continuous single conveyor chain assembly 82 will not become slack. In order to do this, a compensation linkage is provided. As shown, the roller 86 is rotatably mounted to a pair of arms 92, that in turn are pivotally mounted as at 93 to brackets 94 on opposite sides of the machine. In addition, the pick up drum 80, which is a large tube mounted with suitable support members on a center shaft 95, is rotatably mounted between support arms 96 that are pivotally mounted as at 97 to the main frame members 12. The drum 88 can pivot about the pivots 97. A link 98 is pivotally attached as at 99 to each of the arms 96 between the pivots 97 and the shaft 95, and also the links 98 are pivotally mounted as at 100 to the respective arms 92 between the axis of drum 86 and the pivots 93.

Support shoes 104 are provided for engaging the ground, and these are mounted on supports 105 that are fixed to the respective arms 96 for the pick up drum. It should be noted that the roller 87 is rotatably mounted between brackets on the arms 96 for guiding the chain assembly. Thus, if the pick up drum 88 moves upwardly, as indicated by the arrow 106, the arm 96 will pivot about pivots 97, and links 98 will bear against the arms 92 to move the roller 86 rearwardly a sufficient amount to compensate for the change in position of the drum 88 and keep the chain assembly 82 tight.

The shaft 85 is used as a power shaft for the endless chain and is driven with a hydraulic motor 107 driven with fluid under pressure and controlled by a suitable valve. Power is again supplied by a suitable hydraulic system powered by the tractor used for towing. The speed of the motor 107 of course can be set at the desired level in order to drive the chain assembly at the desired speed. Fingers 81, which are spaced laterally on the cross bars 84, move around the drum 88 when the hydraulic motor 107 is driving, and come close to the ground surface so that they will pick up a windrow of loose hay. The teeth 81 will carry the hay up through the chute 76, and out the top opening 79. The stripper assembly 80 at the top removes the hay and guides it outwardly from the chute, and then the fingers 73 will engage the hay and move it downwardly into the body. The fingers 81 pass between the stripper members.

A fragmentary detailed side view of the stripper assembly is shown in FIG. 8. Flat strip members 110, are used and they have a substantially horizontal section extending outwardly from the conveyor, and end portions 111 depend downwardly. The stripper assembly 80 comprises a number of these spaced apart flat members 110 having flat portions adjacent the conveyor discharge opening. The strips 110 are supported on a suitable cross member 112 that is spaced far enough out from the conveyor so that the teeth 81 do not strike the member 112. The cross member 112 is attached to the conveyor 75 with end brackets.

Figure 4:
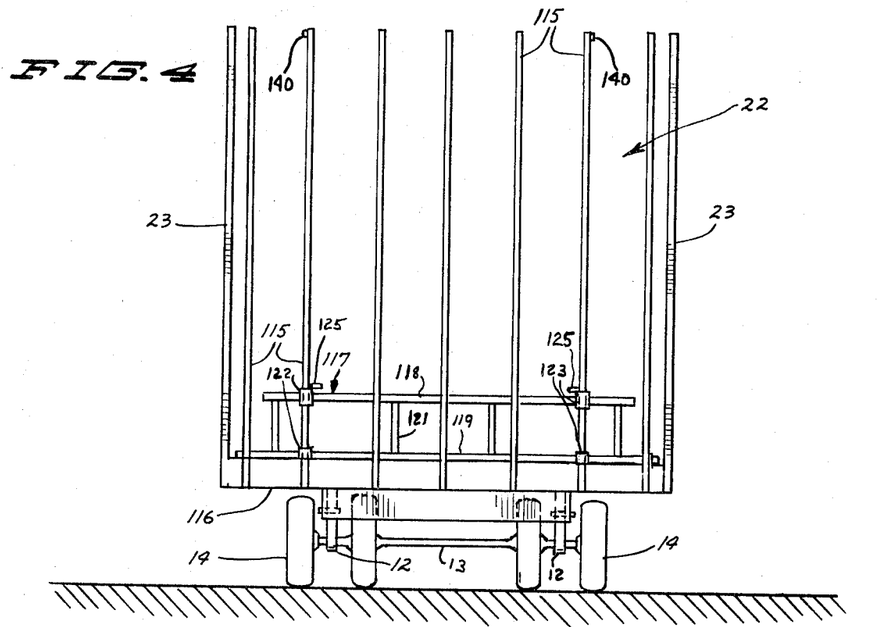
FIG. 4 is a rear elevational view of the device in FIG. 1.

The rear wall 25 of the hay compartment 22 is made in a unique manner to accomplish the purposes of the invention. As shown in FIG. 4, the rear wall is made up of a plurality of upwarding extending spaced apart teeth members 115 that are mounted onto a suitable cross frame member 116. These teeth 115 are fixed in position, and extend upwardly the full height of the hay compartment 22. The teeth 115 are similar to sweep rake teeth. Thus the hay compartment 22 has a slatted back, but the teeth 115 are sufficiently close together so that the hay, when it is pushed against these teeth, will be retained in the hay compartment and will not be forced outwardly.

At the base of the teeth 115, when the hay compartment is in its position as shown in FIG. 4 there is a hay push off assembly 117. This push off assembly includes a frame work that has a pair of spaced apart transversely extending members 118 and 119 respectively, and a third transversely extending member 120 to form a triangle held together with suitable frame members 121. The members 118 and 119 are transversely extending members that rest against the inner surfaces of the teeth 115, and they are slidably guided on two of the teeth with suitable sliding bracket means 122 and 123 which merely comprise U shaped straps fitting over the teeth so that the entire push off assembly 117 will slide along the teeth. In addition, a pair of actuator elements 125 are fixed to the hay push off assembly 117, and the actuators 125 extend outwardly (rearwardly) beyond the teeth 115 so that when the hay compartment 22 is moved into its unloading position as shown in FIG. 3, these actuator elements 125 will be forced into the ground. Because the push off assembly is slidably mounted on the teeth 115, the push off will move relative to the teeth 115 under external forces. With the actuator elements 125 in the ground, and the push off adjacent the floor of the hay compartment, movement of the entire hay compartment forwardly will cause teeth 115 to slide with respect to the push off assembly 117, which is stationary. The push off assembly also holds the formed haystack relative to the ground so that as the hay compartment moves forwardly the hay compartment is slid off the formed stack.

Thus the device is made so that it may be pulled down a field by a tractor, with the tractor straddling the windrow of hay or other forage material which may be stacked, and with the hydraulic motor 107 powered, so that the conveyor chain assembly is operating, the teeth 81 will pick up the hay, carry it up through the chute 76 and will deposit it into the open top hay compartment between the side walls 23,23 and inside the front wall 26. The front wall 26 will be in its full forward position as shown in FIG. 2 during initial loading of hay.

After the hay compartment 22 has been filled sufficiently so that there is a substantial amount of loose hay in the box or body, the packer is actuated by operating the cylinders 62 to extend the rods 64 pushing the carriages 43 rearwardly and thereby carrying the front wall 26 rearwardly to its dotted line position wherein it packs the hay against the rear wall 25.

In order to retain the hay in its packed position so that there is an open area into which additional loose hay can be dumped subsequently, there are hay retainer assemblies indicated generally at 130 on opposite sides of the hay compartment. The retainer assemblies each comprise upper and lower folding arm assemblies that are mounted on shafts 131 which are rotatably mounted on suitable supports on the side walls 23,23. The upper and lower arm assemblies each comprise a first arm 132 drivably or fixedly mounted on shaft 131, and a second arm 133 that is pivotally mounted to the outer end of the first arm 132 and which extends into the hay compartment through guide members 134 in the side walls 23. The openings for the arms 133 in the guide members 134 are elongated slots so that the arms 133 can cock or tilt in fore and aft directions as they move in and out. The shafts 131 can be simultaneously actuated through mechanical or hydraulic actuators. With mechanical actuators the movement of the retainer assemblies could be from linkages actuated by the movement of the front wall or plunger 26. When hydraulic actuators are used, as shown in FIGS. 1 and 2, a pair of hydraulic cylinders 135 are fastened to side walls 23 and operated fluidly in parallel to actuate the respective shafts 131 and the arms attached thereto. The cylinders 135 act on lugs 136 attached to the shafts 131. Upon extension of the cylinders 135 in the usual manner (they are double acting hydraulic cylinders) the hay retainer arms 133 will be moved into the hay compartment to position as shown in solid lines in FIG. 2. The arms 133 are normally retracted for initial filling of the hay compartment. After the front wall or plunger 26 has been actuated to position as shown in dotted lines in FIG. 2, the arms 133 will be moved into the hay compartment and will remain in their inserted position as shown in solid lines. The forward wall 26 is then retracted with cylinders 62. The arms 132 will pass through slots 142 formed between the spaced apart members 48A and B and 49A and B when the front wall is retracted. Then, the hay that has been compressed will be held by the retainer arms 133 in the rear part of the hay compartment, and additional loose hay can be dropped into the forward portions of the hay compartment, forwardly of the arms 133. When the hay compartment is again full the arms 133 are retracted from the compartment by actuating the cylinders 135 and moving the arms 133 to their withdrawn position as shown in dotted lines in FIG. 2 so that the front wall 26 can be moved toward the rear of the hay compartment. The hay in the hay compartment is then again compacted back against the rear wall 25. Arms 133 are reinserted to their solid line position each time after the front wall 26 is moved rearwardly and are held in their inserted position while the hay compartment is again filled. The arms 133 are withdrawn again before the front wall 26 is again moved rearwardly.

In addition to the retainer arms, there are a pair of spring loaded hay retainer fingers which act in the bottom of the hay compartment. The fingers 146 are pivotally mounted as at 147 (see FIG. 9) to the frame members 27 on suitable pivot studs. The fingers 146 are each spring loaded with a spring 148 so that normally they protrude through openings in the hay compartment floor. When the front wall or plunger 26 is moved to compact the hay the fingers 146 will fold to their dotted line position, then when the front wall 26 is retracted, the fingers will spring erect and hold the compressed hay from moving forwardly with the front wall 26.

After the hay has been compacted and the compartment refilled as described several times, for example 4 to 6 times, there will be a number of layers of hay compacted together and formed partially round from the configuration of the front wall 26. These slices or slabs of compacted hay resemble slices of a loaf of bread, with separation planes extending vertically. In order to store this type of a compacted haystack, without having the slices of hay separate and also to insure that rain will be shed to a reasonable degree, the device of the present invention includes means to rotate the stack substantially 90° as shown for unloading so that the separation planes between the different slices or slabs of hay will be substantially horizontal when the stack is stored. The slices will rest on top of one another for stability. The partly curved end of the stack formed by the curvature of the forward wall 26 will then be on top of the stack and will be arcuately shaped to help shed rain. The mobil unit is moved to the position where the haystack is to be stored, after the compacted stack is of the desired size, and the cylinders 33 are actuated to rotate the subframe assembly and the hay compartment now filled with hay substantially 90° until the rear wall teeth 115 rest upon the ground as shown in FIG. 3. At the same time, the actuators 125 for the hay push off will be forced into the ground by the weight of the hay and the power of the cylinders 33. The front wall or plunger 26 is normally compressed against the hay to keep the hay under compression against the rear wall of the hay compartment while the compartment is being rotated to its dumping position. After the hay compartment is in its position as shown in FIG. 3, the front wall or plunger 26 is released and retracted to its forward position by actuating the cylinders 62 to thereby release the compression load against the hay. The arms 133 are removed as well. The entire hay compartment is then pulled forwardly in the direction as indicated by the arrow 141. As the unit is pulled forwardly the teeth 115 slide relative to push off device 117. The push off device 117 remains stationary as the teeth move forwardly to insure that the stack will not go with the hay compartment. The teeth 115 and the compartment itself are withdrawn from the stack leaving the stack in position. This stack is shown at 143 after it has been removed from the hay compartment 22, and after it has expanded upwardly following removal of the compression load from front wall 26. When the front wall or plunger 26 is initially retracted from its compressing position against the haystack, the resilience of the haystack is not as great as that shown for illustrative purposes in FIG. 3, but after the haystack has been released from the compression force, the stack will start to spring upwardly and assume its normal size. The rounded top formed by the wall 26 will shed rain, and the separation planes between hay layers, which are shown schematically at 144 are now horizontal so that rain cannot run down in between the hay layers. The stack will not now tend to fall apart as it would if it were merely laid on its side with the separation planes 144 extending vertically.

Once the stack is completely removed from the hay compartment 22, the cylinders 33 will again be retracted pulling the subframe back down to its normal position, and the hay compartment is again positioned adjacent vertical chute 76 so that it can again receive hay coming from the chute. The unit will be pulled over the ground picking up hay and forming another stack. The hay push off member 117 will slide down the teeth 115 to its original position when the hay compartment is returned to its working position because the teeth 115 will again extend vertically.

Figure 10:
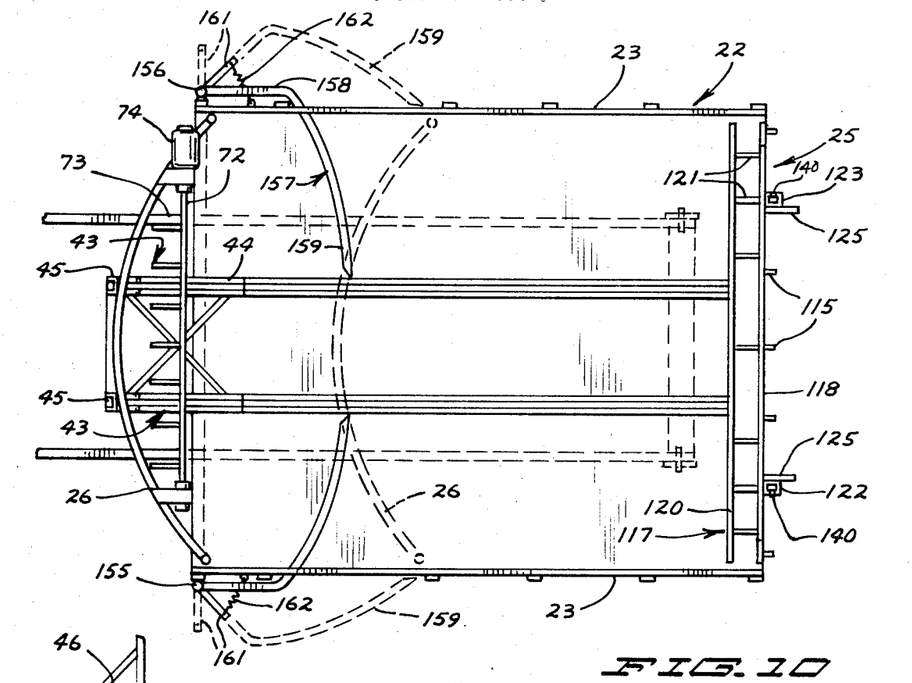
FIGS. 10 and 11 are views showing a modified hay retainer used with the device of the present invention.
Figure 11:
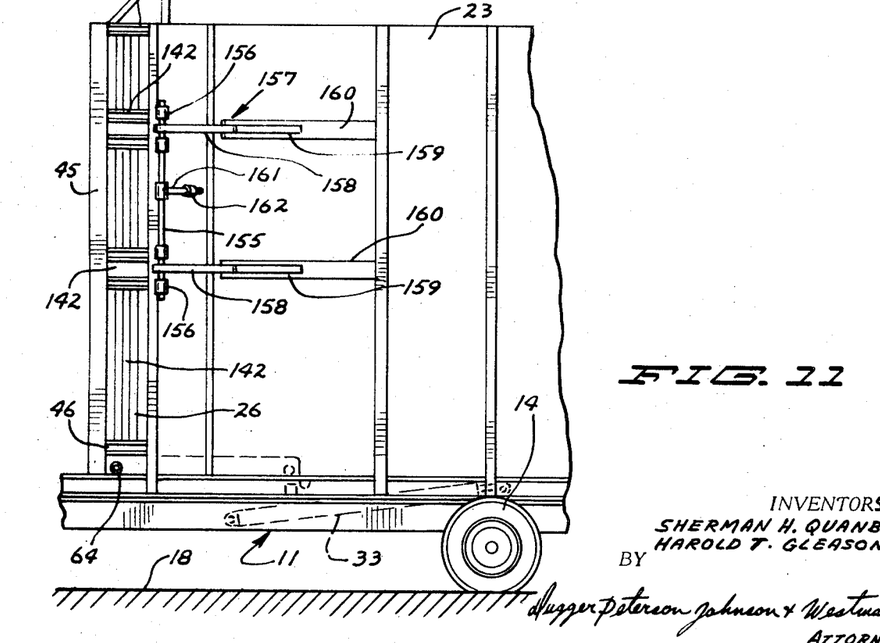

In FIGS. 10 and 11 a variation of the hay retaining arms 133 is shown schematically.

As shown, on each side of the hay compartment there is an upright shaft 155 mounted on bearings 156, which are spaced apart and mounted on the side walls 23. The shafts each mount a hay retaining arm assembly 157. The arm assemblies each include a rearwardly extending portion 158, which is fixed to the respective shaft 155 and a curved transversely extending portion 159. The curved portions extend through slots 160 in the walls 23 into the interior of the hay compartment.

The arm assemblies 157 are spring loaded toward their solid line positions shown in FIG. 10. A load arm 161 is fixed to each shaft, and a spring 162 is attached between each arm 161 and the respective wall 23 to urge the arm assemblies 157 to their solid line position.

When hay has been dropped into the hay compartment, and the movable front wall or plunger 26 is actuated rearwardly to compress the hay, the curvature of the transversely extending arm portions 159 will cause the arm portion 159 to be pushed outwardly. The slope of the arm portion 159 is selected to cause the outward movement. As the arms move, the shafts 155 pivot thereby tensioning springs 162. When the front wall 26 has moved past the ends of arm portions 159, (to position as shown in dotted lines) the arm portions will be snapped back to their solid line position of FIG. 10 by springs 162. When the front wall or plunger 26 is retracted, the arm portion 159 will pass through the slots 142 as do arms 133, and will thus be in position to retain the packed hay in the rear portions of the hay compartment.

The hay compartment would be filled and compacted as described before, and when the compartment is filled, the completed haystack would be unloaded as previously explained.

Thus a single endless conveyor assembly having spring teeth members is utilized both for a hay pick up conveyor, intermittent compression of the hay by hydraulic ram means is provided, and the separation planes between compressed layers of hay are positioned horizontally in the finished stack by rotating the subframe and haystack 90° after forming. The movement of the compressive plunger horizontally eliminates a great deal of frame work necessary when the hay is compressed in vertical direction.

The stop members 140 for the push off 117 serve to keep the push off in place without interfering with removal of the hay stack. While hay has been used as an example in discussing the preferred embodiment, any loose material to be stacked and which can be picked up from a windrow on the ground can be stacked with the present device.

The plunger or ram used could travel horizontally sideways, of course, and the pivoting of the hay compartment would then be done to insure that the planes of the layers are generally horizontal when the stack is deposited on the ground.

The hydraulic components shown use standard control valves well known in the art, and the hydraulic power source may be driven from the tractor P.T.O.

A pivoting finger assembly 150 is placed adjacent the bottom opening of the chute 76 to deflect the hay in the hay windrow downwardly to insure that the hay will not catch and drag on the chute as the unit is moved along.

The term substantially horizontal is meant to include the positioning of the wall of the receptacle spaced from the ground during unloading and also a situation wherein the wall actually inclines downwardly (or upwardly) for unloading. The layers of hay are generally horizontally oriented in the stack when the stack has been removed and deviations from exactly horizontal are acceptable. The layers should be oriented so the stack sheds rain and water doesn't easily run between the layers.

The stackable material could also be material to be stored in a stack, such as brush and tree branches, or even paper or garbage.

What is claimed is:

1. A machine for forming a stack of stackable material comprising a frame member, a receptacle having generally upright walls mounted on said frame member, means to deliver stackable material into said receptacle, compression means operating in a substantially horizontal direction compressing layers of said stackable material with respect to a first wall of said receptacle, means to rotate said receptacle to unloading position with said first wall of said receptacle adjacent to the ground to position the layers substantially horizontally prior to removal of said material from said receptacle, said first wall of said receptacle comprising a plurality of substantially parallel teeth members, and push off means slidably mounted on said teeth members to move hay in the receptacle toward the outer ends of said teeth members when said receptacle has been rotated to unloading position and there is relative movement between the teeth members and said push off means.

2. The combination as specified in claim 1 wherein said frame comprises a main frame, a subframe, and wherein said receptacle is mounted on said subframe, and means to pivotally mount said subframe to said main frame about a substantially horizontal axis to permit movement of said subframe relative to said main frame for substantially 90° of pivoting.

3. The combination as specified in claim 1 wherein said means for delivering said stackable material into said receptacle comprises a pick up and vertical conveyor assembly, said assembly comprising a single endless conveyor member having elongated teeth extending outwardly therefrom, a conveyor chute, one portion of said endless conveyor member passing along said chute, and guide means to guide said conveyor member to position adjacent the ground in its path of travel wherein said teeth will pick up stackable material on the ground and move said material upwardly along said chute, an opposite portion of said conveyor member being external said chute.

4. The combination as specified in claim 3 wherein said guide means to guide said conveyor member for movement adjacent the ground comprises a drum, support means for said drum pivotally mounted to said main frame to permit floating movement of said drum with respect to the ground, and linkage means comprising a tightener roller movable upon floating movement of said drum to control tension in said endless conveyor member.

5. The combination as specified in claim 4 wherein said endless conveyor member comprises a plurality of spaced conveyor chains each formed into a closed loop, and cross members extending between said spaced chains, said teeth members being attached to and projecting from said cross members.

6. The combination as specified in claim 3 wherein said chute is a tubular chute having open ends and said endless conveyor member rides against the interior surface of one wall of said chute with said teeth projecting toward an oppositely facing wall of said chute.

7. A machine for forming a stack of stackable material comprising a frame member, a receptacle having generally upright walls including first and second walls mounted on said frame member, means to deliver stackable material into said receptacle, carriage means for movably supporting said second wall, track means for said carriage means, said track means being supported on said frame, roller guide means on said carriage means for retaining said second wall in its desired position during movement thereof, said second wall being in substantially horizontal direction and comprising compression means to compress layers of said stackable material against a first wall of said receptacle, means to rotate said receptacle to unloading position with said wall of said receptacle adjacent to the ground to position the layers substantially horizontally prior to removal of said material from said receptacle.

8. The combination as specified in claim 7 and means to move said second wall toward said first wall comprising fluid actuated cylinder means, said cylinder means acting against said carriage means.

9. The combination as specified in claim 7 wherein said first wall comprises the rear wall of the hay compartment with respect to the normal direction of travel.

10. The combination as specified in claim 8 wherein said track means for said second wall comprises a pair of longitudinally extending members, each of said longitudinally extending members comprising facing channel members fixed together, means mounting said cylinder means inside said facing channel members, and arm means extending from said carriage means through a provided opening between said facing channel members, and means connecting said arm means to said cylinder means.

11. In a loose material gathering vehicle having means for receiving said loose material the improvement comprising a pick up and conveyor assembly, said assembly comprising a single endless conveyor member having elongated teeth extending outwardly therefrom, a conveyor chute, one portion of said endless conveyor member passing along said chute, guide means to guide said conveyor member to position adjacent the ground in its path of travel wherein said teeth will pick up material on the ground and move said material upwardly along said chute, an opposite portion of said conveyor member being external said chute and said guide means to guide said conveyor member for movement adjacent the ground comprising a drum, support means for said drum pivotally mounted to said main frame to permit floating movement of said drum with respect to the ground, and linkage means comprising a tightener roller movable upon floating movement of said drum to control tension in said endless conveyor member.

12. The vehicle of claim 11 wherein said chute is a tubular chute having open ends and said endless conveyor member rides against the interior surface of one wall of said chute with said teeth projecting toward an oppositely facing wall of said chute.

13. A stack forming machine comprising a frame, a compartment mounted on said frame, said compartment comprising a floor and upstanding side walls and a pair of longitudinally extending frame members, each longitudinally extending frame member comprising a pair of channel shaped members having their legs facing each other and spaced apart along the tops thereof, means to deliver stackable material into said compartment, and compressive packing means to compact material deposited in said compartment, said compressive packing means including a first wall of said compartment, carriage means mounted to said first wall and movably mounted on said longitudinally extending frame members, said wall being movable toward a second opposite wall of said compartment, power means mounted between said channel shaped members and connected to said carriage means, said power means being operable to said first wall toward said second wall to compress material deposited between said first and second walls.

14. The machine of claim 13 further characterized in that said power means moves said first wall under power away from said second wall toward a normal position, and material retaining means to engage material compressed against said second wall and prevent said compressed material from moving with said first wall when the first wall is moved to its normal position.

15. The machine of claim 13 wherein said compartment includes a subframe, means to pivotally mount said subframe to said frame to permit pivotal movement of said compartment to unloading position wherein one of said walls is adjacent the ground, and power means to move said compartment about its pivot.

16. The machine of claim 15 and push off means to remove material from the compartment when the compartment has been pivoted to unloading position.

17. The machine of claim 13 wherein said first wall is formed into a partly curved configuration to form a curved side on said stack.

* * * * *

UNITED STATES PATENT OFFICE
CERTIFICATE OF CORRECTION

Patent No. 3,751,892        Dated August 14, 1973

Inventor(s) Sherman H. Quanbeck et al.

It is certified that error appears in the above-identified patent and that said Letters Patent are hereby corrected as shown below:

Column 10, line 25, (Claim 1, line 15), "hay" should be cancelled and insert --stackable material--. Column 11, line 13, (Claim 7, line 11), after "being" insert --movable--; Column 11, line 13, (Claim 7, line 15), before "wall" insert --first--. Column 12, line 28, (Claim 13, line 18), after "to" insert --move--.

Signed and sealed this 25th day of December 1973.

(SEAL)
Attest:

EDWARD M. FLETCHER, JR.
Attesting Officer

RENE D. TEGTMEYER
Acting Commissioner of Patents